United States Patent
Kwak et al.

(10) Patent No.: US 6,310,658 B1
(45) Date of Patent: Oct. 30, 2001

(54) VIDEO SIGNAL MIXING APPARATUS AND METHOD THEREOF

(75) Inventors: Mal-Seob Kwak; Bong-soon Kang, both of Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/140,783

(22) Filed: Aug. 27, 1998

(30) Foreign Application Priority Data

Aug. 29, 1997 (KR) .................................................. 97-42936

(51) Int. Cl.$^7$ ....................................................... H04N 9/74
(52) U.S. Cl. ........................ 348/585; 348/584; 348/585; 348/586; 348/625; 348/497; 348/512; 382/100; 382/130
(58) Field of Search ..................................... 348/584, 585, 348/586, 625, 512, 497; 382/100, 130

(56) References Cited

U.S. PATENT DOCUMENTS

| | | | |
|---|---|---|---|
| 4,126,886 | * 11/1978 | Takahara et al. ........................ | 360/37 |
| 4,758,892 | * 7/1988 | Bloomfield ........................... | 358/183 |
| 4,851,912 | * 7/1989 | Jackson et al. ....................... | 358/183 |
| 5,003,491 | * 3/1991 | Heckt .................................. | 364/518 |
| 5,027,213 | * 6/1991 | Kamin ................................. | 358/183 |
| 5,305,107 | * 4/1994 | Gale et al. ............................ | 348/590 |
| 5,353,068 | * 10/1994 | Moriwake ............................. | 348/585 |
| 5,428,401 | * 6/1995 | Hinson ................................. | 348/586 |
| 5,675,392 | * 10/1997 | Nayebi et al. ........................ | 348/588 |
| 5,825,433 | * 10/1998 | Yamada et al. ....................... | 348/584 |
| 5,850,267 | * 12/1998 | Abt et al. .............................. | 348/597 |
| 5,953,076 | * 9/1999 | Astle et al. ........................... | 348/584 |
| 6,141,063 | * 10/2000 | Gehrmann ............................ | 348/592 |

\* cited by examiner

*Primary Examiner*—Reinhard J. Eisenzopf
*Assistant Examiner*—Paulos Natnael
(74) *Attorney, Agent, or Firm*—F. Chau & Associates, LLP

(57) ABSTRACT

A video signal mixing apparatus and a method thereof, which is capable of minimizing timing jitter caused when onsynchronized video signals are digitally mixed. A signal subtractor subtracts a second video signal synchronized with a clock signal from a first video signal which is not synchronized with the clock signal, and a weighted value extractor divides one period of the clock signal into N intervals, detects the interval where a digital selection signal is generated, among the N divided intervals, and outputs a predetermined value (where $0 \leq$ predetermined value $\leq 1$) allocated to the detected interval as a weighted value. A multiplier multiplies the weighted value with the output of the signal subtractor and outputs the multiplication result, and a signal mixer mixes the multiplication result with the second video signal and outputs the mixed result as a mixed video signal. Therefore, error causing timing jitter is reduced to 1/N, thereby minimizing dot crawling of the mixed image.

19 Claims, 4 Drawing Sheets

VIDEO SIGNAL MIXING APPARATUS AND METHOD THEREOF

BACKGROUND OF THE INVENTION

1. Field of the Invention

The present invention relates to a video system for mixing a video signal, and more particularly, to a video signal mixing apparatus and method for mixing two video signals while minimizing jitter.

2. Description of the Related Art

FIG. 1 shows a displayed image mixed by a conventional video signal mixing method. Here, the X-axis represents pixels in the horizontal direction, and the Y-axis represents horizontal lines in the vertical directions. FIG. 1 shows a partial screen having 50 pixels×100 horizontal lines.

A mixed image displayed in a video system includes a main screen 12 and a sub-screen 14. It is assumed that a video signal (or an internal video signal) on the main screen 12 is generated by a system A and a video signal (or external video signal) on the sub-screen 14 is generated by a system B.

Here, the internal video signal and external video signal are synchronized with each other based on a video synchronous signal. The video synchronous signal means a horizontal synchronous signal and a vertical synchronous signal. However, the internal and external video signals are not processed using the same system clock signal. That is, the internal video signal is synchronized with a system clock signal (or internal clock signal) of the system A while the external video signal is synchronized with a system clock signal (or external clock signal) of the system B.

When the system A mixes the internal and external video signals in response to a digital selection signal synchronized with the external clock signal, timing jitter occurs in the mixed video signal. This is because a digital selection signal is input to the system A after being delayed by 1 period of the internal clock signal or advanced by 1 period of the internal clock signal, so the point in time that the system A recognizes the digital selection signal has an error of about 1 period of the internal clock signal.

For example, assuming that one period of the internal clock signal is 100 ns, the timing jitter of about 100 ns occurs. That is, whenever the digital selection signal is input to the system A within 1 period of the internal clock signal, timing jitter of 100 ns occurs in the resultant mixed video image.

In a video system having a picture in picture (PIP) function, the above-described timing jitter appears as dot crawl at a vertical boundary 10 by 1 period of the internal clock signal, shown in FIG. 1.

Therefore, a need exists to provide a video signal mixing apparatus capable of minimizing timing jitter caused when digitally mixing video signals which have not been synchronized with each other.

SUMMARY OF THE INVENTION

There is provided a video signal mixing apparatus for digitally mixing a first video signal which is not synchronized with a clock signal and a second video signal which is synchronized with the clock signal, in response to a digital selection signal which is not synchronized with the clock signal, and for outputting the mixed result as a mixed video signal; the apparatus comprising: a signal subtractor for subtracting the second video signal from the first video signal; a weighted value extractor for dividing one period of the clock signal into N intervals for detecting the interval wherein the digital selection signal is generated, and outputting a predetermined value (where 0≦predetermined value≦1) allocated to the detected interval as a weighted value; a multiplier for multiplying the weighted value by the output of the signal subtractor, and outputting the multiplication result; and a signal mixer for mixing the multiplication result with the second video signal and outputting the mixed result as the mixed video signal.

There is also provided a video signal mixing method for digitally mixing a first video signal which is not synchronized with a clock signal and a second video signal which is synchronized with the clock signal, in response to a digital selection signal which is not synchronized with the clock signal, and outputting the mixed signal as a mixed video signal, the method comprising the steps of: (a) dividing one period of the clock signal into N intervals; (b) allocating a predetermined value (0≦predetermined value≦1) to the respective N divided intervals; (c) detecting the interval where the digital selection signal is generated, among the N divided intervals; (d) subtracting the second video signal from the first video signal; (e) multiplying the subtraction result by the predetermined value allocated to the detected interval; and (f) mixing the multiplication result with the second video signal to generate the mixed video signal.

BRIEF DESCRIPTION OF THE DRAWINGS

The above objects and advantages of the present invention will become more apparent by describing in detail a preferred embodiment thereof with reference to the attached drawings in which.

DESCRIPTION OF PREFERRED EMBODIMENTS

Figure 2:
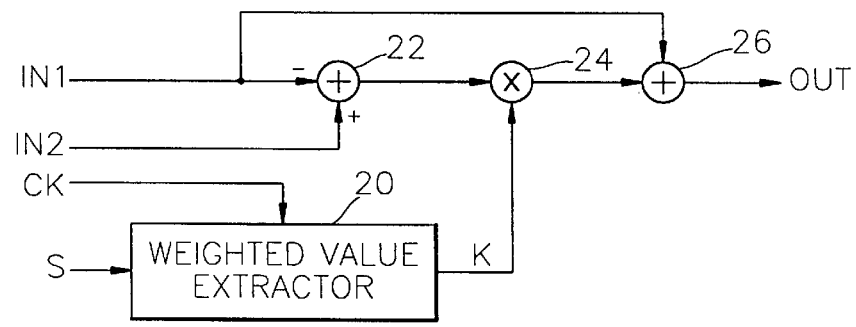
FIG. 2 is a block diagram of a video signal mixing apparatus according to the present invention.

As shown in FIG. 2, a video signal mixing apparatus according to the present invention includes a signal subtractor 22, a weighted value extractor 20, a multiplier 24 and a signal mixer 26.

The signal subtractor 22 shown in FIG. 2 subtracts a second video signal, which is input via an input port IN1 and synchronized with a clock signal CK, from a first video signal, which is input via an input port IN2 and is not synchronized with the clock signal CK, and outputs the subtracted result to the multiplier 24. Here, the first 5 and second video signals are digital signals. In the case where the second video signals is analog, the video signal mixing apparatus may include an analog-to-digital converter (not shown) for converting the analog signals into a digital signal, in accordance with clock signal CK, and outputting the converted digital signal as the second video signal to the input port IN1.

Figure 3A:
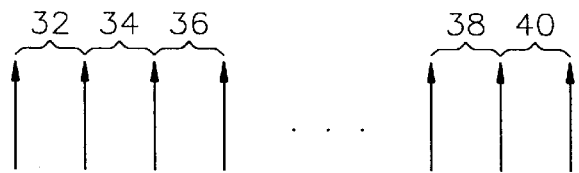
FIGS. 3A through 3C show waveforms of signals input to the video signal mixing apparatus shown in FIG. 2.
Figure 3B:
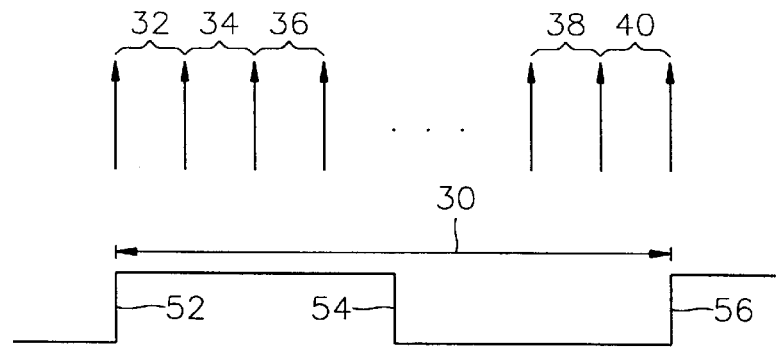
Figure 3C:
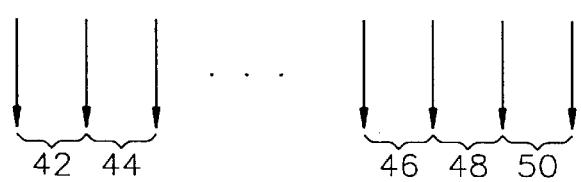

FIGS. 3A through 3C are waveforms of the digital selection signal and the clock signal for the video signal mixing apparatus. In particular, arrows of FIG. 3A represent transition direction in case the level of a digital selection signal S changes to a "high" level from a "low" level. FIG. 3B is a waveform of the clock signal CK having a period 30 and arrows of FIG. 3C represent transition direction in case the level of the digital selection signal S changes to a "low" level from a "high" level.

The weighted value extractor 20 (shown in FIG. 2) divides a period 30 of the clock signal CK, shown in FIG. 3B, into N intervals 32, 34, 36, . . . , 38 and 40 (or 42, 44, . . . , 46, 48 and 50) (where N is a natural number) and detects one of the N intervals where the digital selection signal S is changed. Here, the digital selection signal S is not synchronized with the clock signal CK. Upon detection of the change in the selection signal S, the weighted value extractor 20 outputs a predetermined value (where 0≦predetermined value≦1) allocated to the detected interval to the multiplier 24 as a weighted value K.

Here, predetermined values allocated to each interval may be linear or non-linear For example, the predetermined values applied to the intervals 32, 34, 36, . . . , 38 and 40 (or 42, 44, . . . , 46, 48 and 50), shown in FIG. 3A or 3C, may be linearly determined to be $$\frac{1}{N}, \frac{2}{N}, \frac{3}{N}, \ldots, \frac{N-1}{N} \text{ and } \frac{N}{N},$$

or non-linearly determined to $$\frac{1}{N}, \frac{2.5}{N}, \ldots, \text{and } \frac{N}{N}.$$

Here, when determined values in a non-linear manner, the difference between the predetermined values at the intervals near the center point 54 of the cycle of the clock signal is determined to be smaller, and the difference between the predetermined values at the intervals near the start point 52 or the end point 56 of the cycle of the clock signal is determined to be larger.

The multiplier 24 multiplies the weighted value K output from the weighted value extractor 20 by the output of the signal subtractor 22, and outputs the multiplication result to the signal mixer 26. The signal mixer 26 mixes the multiplication result of the multiplier 24 with the second video signal input via the input port IN1, and outputs the mixed result to an output port OUT as a mixed video signal. Here, the mixed video signal C is expressed by the following equation (1).

$$C = (B - A) = (1 - K) \times A + B \quad (1)$$

where A represents the second video signal and B represents the first video signal.

As a result, the illustrative video signal mixing apparatus according to the present invention outputs only the second video signal to the output port OUT if the predetermined value is '0', and only the first video signal if the predetermined value is '1'. However, as can be understood from the above equation (1), if the predetermined value is greater than '0' and less than '1', the two video signals are mixed according to the weighted value K, and the mixed video signal is output via the output port OUT.

If the digital selection signal S is generated in the interval 32 shown in FIG. 3A the predetermined value ( $$\frac{1}{N} \text{ or } \frac{2.5}{N}$$

in the above example) allocated to the interval 32 is output as a weighted value. Thus, a mixing video signal C expressed by the following equation (2) is output via the output port OUT.

$$C = \frac{N-1}{N} \times A + \frac{B}{N} \text{ or } \frac{N-2.5}{N} \times A + \frac{2.5}{N} \times B \quad (2)$$

Figure 4:
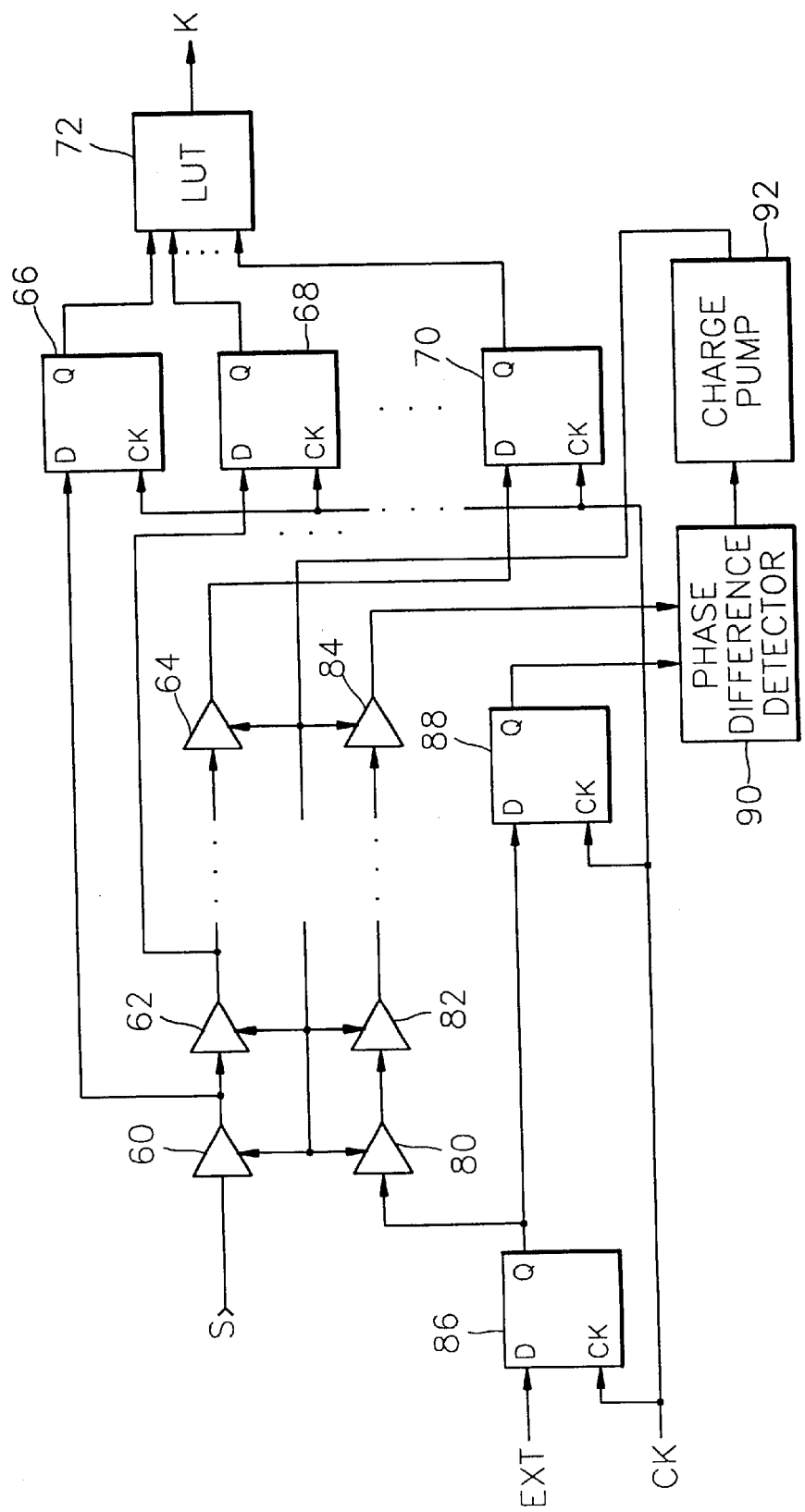
FIG. 4 is a circuit diagram of a weighted value extractor of FIG. 2 according to a preferred embodiment of the present invention.

FIG. 4 shows a circuit diagram of the weighted value extractor 20 shown in FIG. 2 according to a preferred embodiment of the present invention. The weighted value extractor 20 includes first through Nth buffers 60, 62, . . . , and 64, (N+1)th through (2N)th buffers 80, 82, . . . and 84, first through Nth D flip-flops 66, 68, . . . and 70, (N+1)th and (N+2)th D flip-flops 86 and 88, a phase difference detector 90, a charge pump 92 and a look-up table (LUT) 72.

The first buffer 60 of FIG. 4 outputs the digital selection signal S to the second buffer 62 after delaying by a predetermined time, and the Xth buffer, one of the second through (N−1)th buffers, outputs the output of the (X−1)th buffer to the (X+1)th buffer after delaying by a predetermined time. Here, the Nth buffer 64 outputs the output of the (N−1)th buffer to the Nth D flip-flop 70 after delaying by a predetermined time.

The output of the Yth buffer, one of the first through Nth buffers 60, 62, . . . , and 64, is output to the data input port D of the corresponding Yth D flip-flop, one of the first through Nth D flip-flops 66, 68, . . . and 70. The clock signal CK is connected to the clock port CKs of flip-flop 66, 68, and 70 and outputs Q are connected to the address port of the LUT 72. Here, the LUT 72 has prestored the predetermined values allocated to the N divided intervals, and outputs the predetermined value stored at the address as the weighted value K. The predetermined values stored in the LUT 72 may be non-linear or linear as described above.

Assuming N=8, the addresses of the LUT 72 and the predetermined values stored at the addresses can be, for example, represented by the following table 1.

TABLE 1

| AD-DRESS | NON-LINEAR PREDETERMINED VALUE | | LINEAR PREDETERMINED VALUE | |
|---|---|---|---|---|
| | decimal | binary | decimal | binary |
| 00000000 | −7 | 1001 | 0.000 | 0 000 |
| 00000001 or 10000000 | −6 | 1010 | 0.125 | 0 001 |
| 00000011 or 11000000 | −5 | 1011 | 0.250 | 0 010 |
| 00000111 or 11100000 | −3 | 1101 | 0.375 | 0 011 |
| 00001111 or 11110000 | 0 | 0000 | 0.500 | 0 100 |
| 00011111 or | +3 | 0011 | 0.625 | 0 101 |

TABLE 1-continued

| AD-DRESS | NON-LINEAR PREDETERMINED VALUE | | LINEAR PREDETERMINED VALUE | |
|---|---|---|---|---|
| | decimal | binary | decimal | binary |
| 11111000 00111111 or 11111100 | +5 | 0101 | 0.750 | 0 110 |
| 01111111 or 11111110 | +6 | 0110 | 0.875 | 0 111 |
| 11111111 | +7 | 0111 | 1.000 | 1 000 |

In table 1, the MSB of the binary representation of the linear predetermined value represents an integer and the remaining 3 bits except for the MSB represent the value below the floating point. Here, the addresses of 8 bits include none, one, two, three, four, five, six, seven and eight '1's, respectively.

The (N+1)th through (2N)th buffers 80, 82, . . . and 84, the (N+1)th and (N+2)th flip-flops 86 and 88, the phase difference detector 90 and the charge pump 92 perform a function of controlling the delay time of the first through Nth buffers 60, 62, . . . , and 64 as herein described.

The (N+1)th D flip-flop 86 receives a signal EXT having frequency obtained by dividing the frequency of the clock signal CK by a predetermined number which is greater than or equal to 2, through a data input port D, and the clock signal CK through the clock port CK. The (N+2)th D flip-flop 88 receives the output Q of the (N+1)th D flip-flop 86, and the clock signal CK through the clock port CK. The signal EXT can be generated by a frequency-divider (not shown) which can be part of the weighted value extractor 20 shown in FIG. 2 or an externally connected device. The phase difference detector 90 detects the phase difference between the output Q of the (N+2)th D flip-flop 88 and the signal output from the (2N)th buffer 84, and outputs the detected phase difference to the charge pump 92. The charge pump 92 sinks or sources a charge, corresponding to the phase difference output from the phase difference detector 90, and outputs a signal having a level corresponding to the pumped charge amount to the first through (2N)th buffers 60, 62, . . . , 64 and 80, 82, . . . and 84. The delay time of the first through (2N)th buffers 60, 62, . . . , 64, and 80, 82, . . . , and 84 varies according to the level of the signal output from the charge pump 92.

Also, the (N+1)th buffer 80 outputs the output Q of the (N+1)th D flip-flop 86 to the (N+2)th buffer 82 after delaying by the predetermined time, and the Zth buffer (one of the (N+2)th through (2N−1)outputs the output of the (Z−1)th buffer to the (Z+1)th buffer after delaying by the predetermined time. Here, the (2N)th buffer 84 outputs the output of the (2N−1)th buffer to the phase difference detector 90 after delaying by the predetermined time.

With the appropriate delay generated by the phase difference detector 90, charge pump 92, and buffers 60, 62–64 and 80,82 and 88, the occurrence of the selection signal S can be detected at the precise Nth interval.

As an illustration, if the above-described video signal mixing apparatus, shown in FIG. 2, is applied to a television receiver or a video cassette recorder having a function of an on-screen display (OSD), the OSD signal is input to the input port IN2 as the first video signal, and an RGB signal is input to the input port IN1 as the second video signal. A video signal mixed from the OSD signal and the RGB signal is output through the output port OUT.

Hereinafter, a video signal mixing method according to the present invention will be described with reference to the appended drawings.

Figure 5:
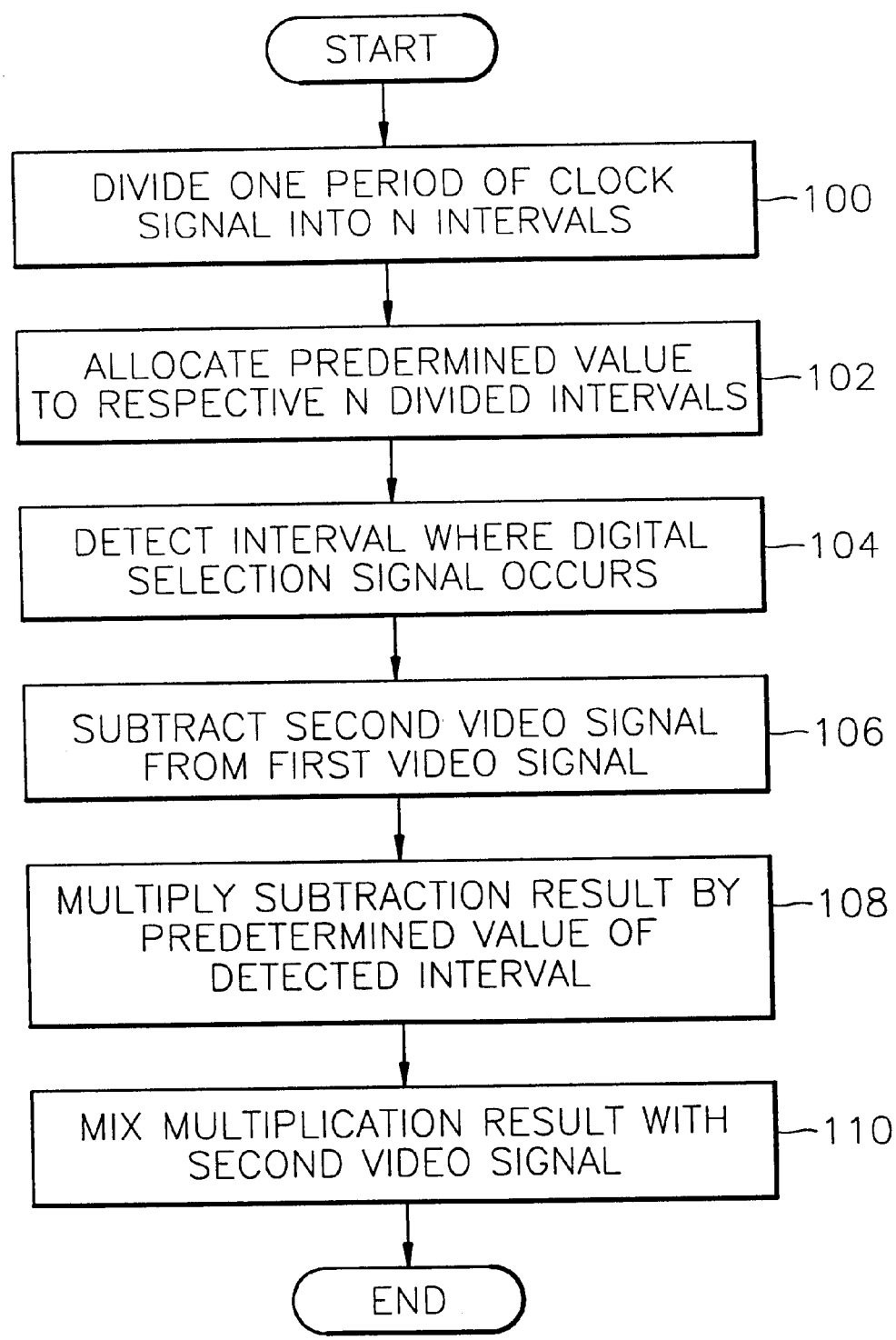
FIG. 5 is a flowchart illustrating a video signal mixing method according to the present invention, performed by the apparatus shown in FIG. 2.

FIG. 5 is a flowchart illustrating a video signal mixing method according to the present invention, which is implementable by the video signal mixing apparatus shown in FIG. 2. The video signal mixing method includes the steps 100 through 104 of calculating the weighted value for the interval where the digital selection signal S is generated. The method also includes the steps 106 through 110 of generating a mixed video signal using the weighted value and the first and second video signals.

Prior to describing the video signal mixing method with reference to FIG. 5, it is assumed that a video signal which is not synchronized with the clock signal CK is referred to as a first video signal and a video signal which is synchronized with the clock signal CK is referred to as a second video signal.

Similar to the description above for FIG. 2, a weighted value of the interval where the digital selection signal S is generated (steps 100 through 104). That is, one period of the clock signal CK is divided into N intervals in step 100. Then, a predetermined value is allocated to each of the N divided intervals in step 102. After the step 102, the interval where the digital selection signal S, which is not synchronized with the clock signal CK, occurs is detected among the N divided intervals in step 104.

After the step 104, a mixed video signal expressed by the equation (1) is generated using the weighted value and the first and second video signals in steps 106 through 110. In particular, a second video signal synchronized with the clock signal CK, is subtracted from the first video signal which is not synchronized with the clock signal CK in step 106. Then, the subtraction result and the weighted value of the interval detected in the step 106 are multiplied in step 108. After the step 108, the multiplication result and the second video signal are then mixed to generate a mixed video signal in step 110.

Figure 6:
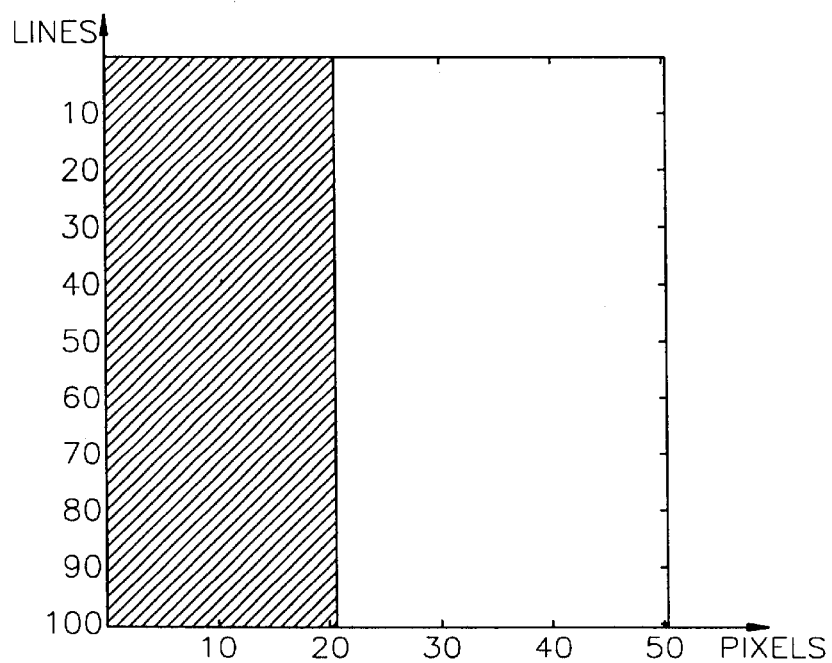
FIG. 6 shows a displayed image mixed by the video signal mixing apparatus according to the present invention.

FIG. 6 shows a displayed image of a mixed video signal using the illustrative mixing method and mixing apparatus according to the present invention. Here, the X-axis represents pixels in the horizontal direction and the Y-axis represents horizontal lines. For example, FIG. 6 shows the part of the screen having 50 pixels×100 horizontal lines.

Figure 1:
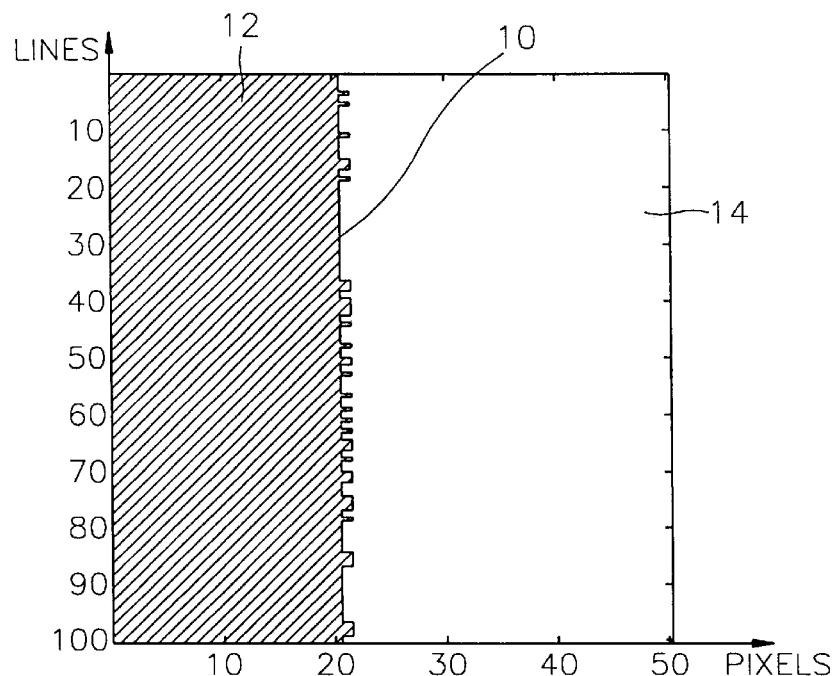
FIG. 1 shows a displayed image mixed by a conventional video signal mixing method.

According to the conventional video signal mixing method, the first video signal which is not synchronized with the clock signal CK, and the second video signal synchronized with the clock signal CK, are selectively output according to the digital selection signal S, to generate a mixed video signal, as generally shown in FIG. 1. Advantageously, using the illustrative video signal mixing apparatus and method according to the present invention, the first and second video signals are mixed according to the weighted value K to generate a mixed video signal. The mixed signal is generally as shown in FIG. 6, which the dot crawling at the vertical boundary is markedly less than the dot crawling at the vertical boundary shown in FIG. 1.

The illustrative video signal mixing apparatus and method of the present invention is applicable to any video system which mixes signals as well as a television receiver or a video cassette recorder.

As described above, in the video signal mixing apparatus and the method thereof according to the present invention, a weighted value is allocated according to the point in time where the digital selection signal S which is not synchronized with the clock signal CK is generated, and two video signals, one of which is synchronized with the clock signal CK and the other of which is not synchronized with the clock signal CK, are mixed according to the weighted value K. Thus, the error causing timing jitter is reduced to 1/N, thereby minimizing dot crawling of the mixed image.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A video signal mixing apparatus for digitally mixing a first video signal which is not synchronized with a clock signal and a second video signal which is synchronized with the clock signal, in response to a digital selection signal which is not synchronized with the clock signal, and for outputting the mixed result as a mixed video signal; the apparatus comprising:

a signal subtractor for subtracting the second video signal from the first video signal;

a weighted value extractor for dividing one period of the clock signal into N intervals for detecting the interval wherein the digital selection signal is generated, and outputting a predetermined value allocated to the detected interval as a weighted value;

a multiplier for multiplying the weighted value by the output of the signal subtractor, and outputting the multiplication result; and a signal mixer for mixing the multiplication result with the second video signal and outputting the mixed result as the mixed video signal.

2. The apparatus according to claim 1, wherein said predetermined value (k) is greater than or equal to zero and less than or equal to one.

3. The apparatus according to claim 1, wherein said predetermined value is one of a linear fraction $$\frac{1}{N}, \frac{2}{N}, \frac{3}{N}, \cdots \frac{N}{N}$$

and a non-linear fraction $$\frac{1}{N}, \frac{2.5}{N}, \cdots \frac{N}{N}.$$

4. The apparatus according to claim 1, wherein said weighted value extractor includes:

a first set of delay elements for delaying a clocked signal;

a second set of delay elements for delaying said digital selection signal, said first and second sets of delay elements having a one-to-one correspondence;

delay adjustment means for adjusting said first and second sets of corresponding delay elements by a delay amount based on a phase difference between first and and second signals, said first signal is derived from said clocked signal and said second signal is from an output of the first set of delay elements.

5. The apparatus according to claim 4, wherein outputs of said second set of delay elements are addresses of a look-up-table having pre-stored predetermined values.

6. The apparatus according to claim 1, wherein said predetermined value is one of a plurality of predetermined values stored in a look-up-table.

7. The apparatus according to claim 1, further comprising an analog-to-digital converter (ADC) for converting an analog video signal into a digital video signal in response to the clock signal, and outputting the converted digital signal as the second video signal.

8. The apparatus according to claim 1, wherein the second video signal is an RGB signal processed as a video signal, and the first video signal is an on-screen display (OSD) signal.

9. A video signal mixing method for digitally mixing a first video signal which is not synchronized with a clock signal and a second video signal which is synchronized with the clock signal, in response to a digital selection signal which is not synchronized with the clock signal, and outputting the mixed signal as a mixed video signal, the method comprising the steps of: (a) dividing one period of the clock signal into N intervals; (b) allocating N weighted values, each corresponding to a respective one of the N divided intervals; (c) detecting the interval where the digital selection signal is activated, among the N divided intervals; (d) subtracting the second video signal from the first video signal; (e) multiplying the subtraction result by the weighted value allocated to the detected interval; and (f) mixing the multiplication result with the second video signal to generate the mixed video signal.

10. The mixing method according to claim 9, wherein said weighted values are greater than or equal to zero and less than or equal to one.

11. The mixing method according to claim 9, wherein said weighted values are linear.

12. The mixing method according to claim 9, wherein said weighted values are nonlinear.

13. The method according to claim 9, wherein said step of detecting includes the steps of:

delaying a clocked signal by a first set of delay elements;

delaying said digital selection signal by a second set of delay elements, said first and second sets of delay elements having a one-to-one correspondence;

adjusting said first and second sets of corresponding delay elements by a delay amount based on a phase difference between first and second signals, said first signal is derived from said clocked signal and said second signal is from an output of the first set of delay elements.

14. The method according to claim 13, wherein outputs of said second set of delay elements form addresses of a look-up-table having pre-stored weighted values.

15. The method according to claim 9, wherein said weighted value is one of a plurality of predetermined values stored in a look-up-table.

16. An apparatus for mixing a first signal (A) which is synchronized with a clock and a second signal (B) which is not synchronized with the clock when a select signal (S) is activated, said select signal is not synchronized to the clock, the apparatus comprising:

means for generating a weighted value (K), K being dependent upon a point of time within a clock cycle of said clock at which said select signal is activated;

means for implementing (B−A) K+A to mix said first and second signals.

17. The apparatus according to claim 16, wherein K is progressively larger at the beginning or end portion of said clock cycle than the midpoint of said clock cycle.

18. The apparatus according to claim 16, further including a memory for storing a plurality of weighted values K.

19. The apparatus according to claim 18, wherein an address of said memory is formed based on a timing relationship between said select signal and said clock.

* * * * *